(12) United States Patent
Converse et al.

(10) Patent No.: US 10,574,829 B2
(45) Date of Patent: Feb. 25, 2020

(54) INTEGRATING ADDITIONAL INFORMATION INTO A TELECOMMUNICATIONS CALL

(71) Applicant: Google LLC, Mountain View, CA (US)

(72) Inventors: Joshua Converse, Mountain View, CA (US); Brett Barros, Mountain View, CA (US); Jamie Burrell, Mountain View, CA (US); Paul Cole, Mountain View, CA (US); Lilia Royanova, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/553,734

(22) PCT Filed: Dec. 28, 2016

(86) PCT No.: PCT/US2016/068795
§ 371 (c)(1),
(2) Date: Aug. 25, 2017

(87) PCT Pub. No.: WO2018/125068
PCT Pub. Date: Jul. 5, 2018

(65) Prior Publication Data
US 2018/0241884 A1  Aug. 23, 2018

(51) Int. Cl.
*H04M 7/00* (2006.01)
*H04L 29/06* (2006.01)
(Continued)

(52) U.S. Cl.
CPC ........ *H04M 7/003* (2013.01); *H04L 65/1053* (2013.01); *H04L 65/1059* (2013.01);
(Continued)

(58) Field of Classification Search
CPC ............. H04L 65/1053; H04L 65/1059; H04L 65/1069; H04M 7/003
See application file for complete search history.

(56) References Cited

U.S. PATENT DOCUMENTS

2007/0265830 A1 11/2007 Sidhu et al.
2007/0294354 A1* 12/2007 Sylvain ............. H04L 29/06027
709/206
(Continued)

FOREIGN PATENT DOCUMENTS

JP     2016-005194    1/2016
WO   WO 2016/031027   3/2016

OTHER PUBLICATIONS

International Search Report and Written Opinion issued in International Application No. PCT/US2016/068795, dated Jun. 12, 2017, 14 pages.

(Continued)

*Primary Examiner* — Mohammad S Anwar
(74) *Attorney, Agent, or Firm* — Fish & Richardson P.C.

(57) ABSTRACT

Methods, systems, and apparatus include computer programs encoded on a computer-readable storage medium, including a method for providing information. A request is received by a call routing server to establish a call between a client device and a remote telecommunications device. A given transmission criterion that triggered distribution of the particular digital component to the client device is determined by a call context server. A set of contextual information that is mapped to the given transmission criterion is identified, by the call context server, in a data store storing a mapping of transmission criteria to contextual information. The client device is connected, by the call routing server, to the remote telecommunications device using the phone number. The set of contextual information is transmitted to the remote telecommunications device or a computing device that is associated with the remote telecommunications device while the call is being connected or in progress.

20 Claims, 4 Drawing Sheets

(51) Int. Cl.
  *H04M 3/02* (2006.01)
  *H04M 3/42* (2006.01)
(52) U.S. Cl.
  CPC .......... *H04L 65/1069* (2013.01); *H04M 3/02* (2013.01); *H04M 3/42042* (2013.01); *H04M 7/006* (2013.01)

(56) References Cited

U.S. PATENT DOCUMENTS

| | | | |
|---|---|---|---|
| 2008/0086368 A1* | 4/2008 | Bauman | G06Q 30/02 705/7.34 |
| 2008/0189360 A1* | 8/2008 | Kiley | G06F 17/30867 709/203 |
| 2012/0208526 A1* | 8/2012 | Fisher | H04M 3/2218 455/423 |
| 2013/0165086 A1* | 6/2013 | Doulton | G06Q 10/107 455/414.4 |

OTHER PUBLICATIONS

International Search Report and Written Opinion issued in International Application No. PCT/US2017/068716, dated May 24, 2018, 13 pages.
EP Office Action issued in European Application No. 17851918.7, dated Feb. 22, 2019, 6 pages.
JP Notice of Reason for Rejection in Japanese Application No. 2018/544476, dated Sep. 24, 2019, 7 pages (with English translation).
JP Notice of Allowance in Japanese Application No. 2018-544476, dated Dec. 26, 2019, 5 pages (with English translation).

* cited by examiner

INTEGRATING ADDITIONAL INFORMATION INTO A TELECOMMUNICATIONS CALL

CROSS-REFERENCE TO RELATED APPLICATION

This application is a National Stage Application under 35 U.S.C. § 371 and claims the benefit of International Application No. PCT/US2016/068795, filed Dec. 28, 2016. The disclosure of the foregoing application is hereby incorporated by reference in its entirety.

BACKGROUND

This specification relates to integrating additional information into a telecommunications call.

The Internet provides access to a wide variety of resources, information, and types of content. Some forms of content cause client devices to take action in response to user interaction with the content. For example, content that includes a click-to-call component causes a client device to initiate a telephone call when a user interacts with the click-to-call component.

SUMMARY

In general, in one aspect there is provided a method, comprising: receiving, by a call routing server, a request to establish a call between a client device and a remote telecommunications device, the request including an indication that a click-to-call control was interacted with when visually presented at the client device, the click-to-call control being presented together with a particular digital component; determining, by a call context server and based on a phone number included in the request, a given transmission criterion that triggered distribution, to the client device, of the particular digital component that was visually presented with the click-to-call control at the client device at a time of the interaction with the click-to-call control; identifying, in a data store storing a mapping of transmission criteria to contextual information and by the call context server, a set of contextual information that is mapped to the given transmission criterion; connecting, by the call routing server, the client device to the remote telecommunications device using the phone number; and transmitting, by the call context server, the set of contextual information to the remote telecommunications device or a computing device that is associated with the remote telecommunications device while the call is being connected or in progress.

Receiving an indication that a click-to-call control was interacted with at a client device may comprise receiving VoIP call information that specifies the phone number corresponding to the particular digital component that was presented with the click-to-call control; and transmitting the set of contextual information to the remote telecommunications device comprises embedding the set of contextual information in VoIP call setup data that is transmitted to the remote telecommunications device.

Transmitting the set of contextual information to the remote telecommunications device may comprise transmitting an audible message that audibly conveys the set of contextual information when the remote telecommunications device is activated to receive the call, but prior to enabling audio communications between a user of the client device and a user of the remote telecommunications device.

Receiving a request to establish a call may comprise receiving a request that specifies a search query that triggered presentation of the particular digital component that was visually presented with the click-to-call control at the client device at a time of the interaction with the click-to-call control; and transmitting the set of contextual information to the remote telecommunications device comprises generating packetized data that specifies a particular post call activity that is mapped to the given transmission criterion in the data store.

The packetized data may cause the remote telecommunications device to visually present the particular post call activity on a display.

Transmitting the set of contextual information to the remote telecommunications device may comprise transmitting the set of contextual information as caller identification information that is presented in a caller identification field of a display of the remote telecommunications device. Transmitting the set of contextual information to the remote telecommunications device may comprise transmitting text to speech data specifying the set of contextual information to the remote telecommunications device.

Determining, by a call context server and based on the phone number included in the request, a given transmission criterion that triggered distribution, to the client device, of the particular digital component that was visually presented with the click-to-call control at the client device at a time of the interaction with the click-to-call control may comprise: determining the particular digital component based on the phone number included in the request, and determining, based on the time of the interaction or an identifier of the particular digital component, the given transmission criterion.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

Particular implementations may realize none, one or more of the following advantages. A recipient of a call that originates from user interaction with a click-to-call control can be presented with additional information (e.g., other than information provided by the click-to-call control) obtained from user interactions with resources other than the click-to-call control. The additional information can be used to automatically populate data fields associated with the call, which can reduce data entry errors and complete various tasks associated with the call in less time. The additional information can include online activity (or information derived from online activity) performed at the client device (or by a user of the client device) prior to user interaction with the click-to-call control. The online activity can be embedded into data fields of the call data created by the user interaction with the click-to-call control to generate a combined data set that includes both information required to connect the client device to the called number and the additional information. Embedding the additional data into the combined data set enables the device that receives the call to obtain and/or present the additional data prior to the call being answered, thereby providing additional information about the nature or purpose of the call prior to the call being answered. Additional information that would otherwise not be available at a called device is able to be presented by providing the additional information (e.g., user online activity or activity with an application installed on a calling device) by formatting the additional information as call data and providing the information to the called device. Implementations may address problems associated with how to provide information about a caller to a call recipient associated with the caller's online activity.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for providing additional information (also referred to as contextual information) beyond that used to connect a telecommunications call to a callee. For example, a request can be received by a call routing server to establish a call between a client device and a remote telecommunications device (e.g., that is located at a different location than the client device). The request can include an indication (e.g., a data flag or other data) that a click-to-call control was interacted with, e.g., by a user, when visually presented at the client device. The click-to-call control can be presented together with a particular digital component, such as being provided as a control presented with a search results page presented in response to a search query that was submitted from the client device, e.g., by the user.

Based on a phone number included in (or received with) the request, a call context server can determine a given transmission criterion that triggered distribution, to the client device, of the particular digital component. For example, the given transmission criterion can be a search query (or a phrase matching the search query, such as a distribution keyword) that triggered presentation of the particular digital component that was visually presented with the click-to-call control at the client device when the user interacted with the click-to-call control.

Using the given transmission criterion, the call context server can identify a set of contextual information that is mapped to the given transmission criterion, and transmit the set of contextual information to the remote telecommunications device being called or a computing device that is associated with the remote telecommunications device, e.g., while the call is being connected or is in progress. In some implementation, the call context server transmits the set of contextual information to the remote telecommunications device while the call routing server connects the client device to the remote telecommunications device (e.g., in parallel or asynchronously). In some implementations, the call context server transmits the set of contextual information to the remote telecommunications device by way of the call routing server. For example, the call context server can provide the set of contextual information to the call routing server, which can, in turn, include the set of contextual information in call setup data that is transmitted to the remote telecommunications device to establish the call or other call data that is transmitted to the remote telecommunications device during the call setup or after the call setup is complete. When the remote telecommunications device receives the set of contextual information, the remote telecommunications device can present some, or all of, the set of contextual information in a display during call set up, or during the call.

The mapping of contextual information to transmission criterion can occur over time, for example, using historical information identifying user interactions and corresponding results. For example, the historical information can identify keywords used by users (such as in search queries), the corresponding resources that were selected based on the keywords and presented to the users, and conversions by the users. Conversions can include, for example, user selection of click-to-call controls, user purchases, user navigation to or selection of other content, or other user actions resulting from the presentation of and reaction to content. The mapping, for example, can indicate (or be used to infer) user interest in a topic, such as by identifying keywords that trigger the presentation of content to the user that is related to a specific topic.

Figure 1:
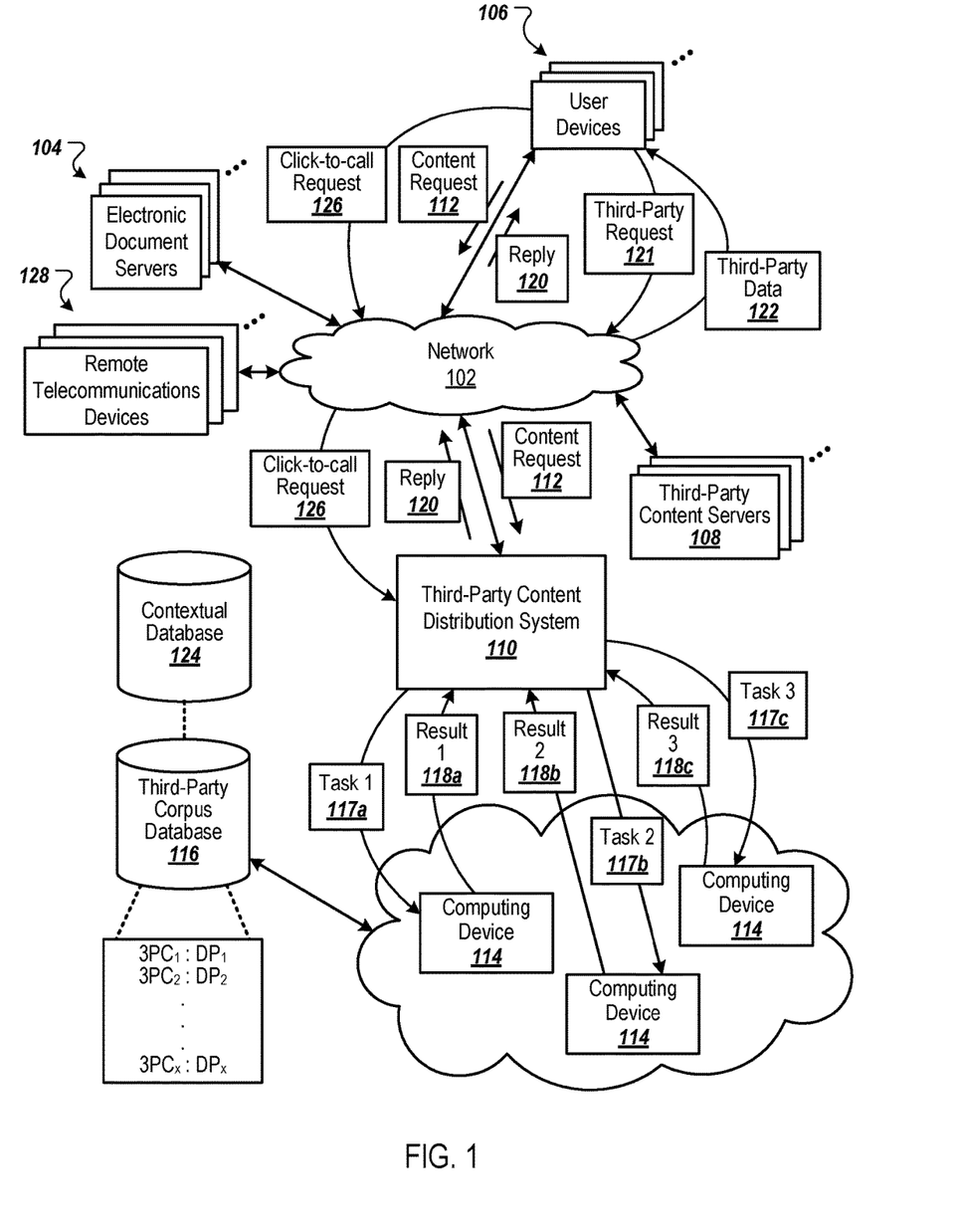
FIG. 1 is a block diagram of an example environment in which content is distributed to client devices.

FIG. 1 is a block diagram of an example environment 100 in which content is distributed to client devices. The example environment 100 includes a network 102, such as a local area network (LAN), a wide area network (WAN), the Internet, or a combination thereof. The network 102 connects electronic document servers 104, client devices 106, third-party content servers 108, and a third-party content distribution system 110 (also referred to as a content distribution system). The example environment 100 may include many different electronic document servers 104, client devices 106, and third-party content servers 108. In some implementations, content can be provided to remote telecommunications devices 128, e.g., that support systems and entities providing products and/or services. For example, the remote telecommunications devices 128 can include communications devices located at entities that may provide products and/or services to users who use the client devices 106. Further, the environment 100 can enable communications between the users and the entities, as described in more detail below. In some implementations, the third-party content distribution system 110 can include a call routing server 214 (e.g., for routing click-to-call calls) and a call context server 220 (e.g., for providing contextual information for the routed calls), as described below with reference to FIG. 2.

A client device 106 is an electronic device that is capable of requesting and receiving resources (e.g., electronic documents) over the network 102. Example client devices 106 include personal computers, mobile communication devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104. For example, the electronic document servers 104 can include servers that host publisher websites. In this example, the client device 106 can initiate a request for a given publisher webpage, and the electronic document server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the client device 106 to request content from the data source when the given electronic document is processed (e.g., rendered or executed) by a client device 106. The client device 106 integrates the content obtained from the data source into a presentation of the given electronic document to create a composite electronic document including the content obtained from the data source.

In some situations, a given electronic document can include a third-party tag or third-party script (e.g., portion of code) that references the third-party content distribution system 110. In these situations, the third-party tag or third-party script is executed by the client device 106 when the given electronic document is processed by the client device 106. Execution of the third-party tag or third-party script configures the client device 106 to generate a content request 112 for third-party content, which is transmitted over the network 102 to the third-party content distribution system 110. For example, the third-party tag or third-party script can enable the client device 106 to generate packetized data request including a header and payload data. The content request 112 can include data such as a name (or network location) of a server from which the third-party content is being requested, a name (or network location) of the requesting device (e.g., the client device 106), and/or information that the third-party content distribution system 110 can use to select third-party content provided in response to the request. The content request 112 is transmitted, by the client device 106, over the network 102 (e.g., a telecommunications network) to a server of the third-party content distribution system 110.

The content request 112 can include data specifying the electronic document and characteristics of locations at which third-party content can be presented. For example, data specifying a reference (e.g., URL) to an electronic document (e.g., webpage) in which the third-party content will be presented, available locations (e.g., third-party content slots) of the electronic documents that are available to present third-party content, sizes of the available locations, positions of the available locations within a presentation of the electronic document, and/or media types that are eligible for presentation in the locations can be provided to the third-party content distribution system 110. Similarly, data specifying keywords associated with the electronic document ("document keywords") or entities (e.g., people, places, or things) that are referenced by the electronic document can also be included in the content request 112 (e.g., as payload data) and provided to the third-party content distribution system 110 to facilitate identification of third-party content items that are eligible for presentation with the electronic document.

Content requests 112 can also include data related to other information, such as information that the user has provided, geographic information indicating a state or region from which the request was submitted, or other information that provides context for the environment in which the third-party content will be displayed (e.g., a type of device at which the third-party content will be displayed, such as a mobile device or tablet device). Data specifying characteristics of the client device 106 can also be provided in the content request 112, such as information that identifies a model of the client device 106, a configuration of the client device 106, or a size (e.g., physical size or resolution) of an electronic display (e.g., touchscreen or desktop monitor) on which the electronic document is presented. Content requests 112 can be transmitted, for example, over a packetized network, and the content requests 112 themselves can be formatted as packetized data having a header and payload data. The header can specify a destination of the packet and the payload data can include any of the information discussed above.

The third-party content distribution system 110 selects third-party content (e.g., information about apps) that will be presented with the given electronic document in response to receiving the content request 112 and/or using information included in the content request 112. In some implementations, the third-party content is selected in less than a second to avoid errors that could be caused by delayed selection of the third-party content. For example, delays in providing third-party content in response to a content request 112 can result in page load errors at the client device 106 or cause portions of the electronic document to remain unpopulated even after other portions of the electronic document are presented at the client device 106. Also, as the delay in providing third-party content to the client device 106 increases, it is more likely that the electronic document will no longer be presented at the client device 106 when the third-party content, thereby negatively impacting a user's experience with the electronic document. Further, delays in providing the third-party content can result in a failed delivery of the third-party content, for example, if the electronic document is no longer presented at the client device 106 when the third-party content is provided.

In some implementations, the third-party content distribution system 110 is implemented in a distributed computing system that includes, for example, a server and a set of multiple computing devices 114 that are interconnected and identify and distribute third-party content in response to the content requests 112. The set of multiple computing devices 114 operate together to identify a set of third-party content that are eligible to be presented in the electronic document from among a corpus of millions of available third-party content (3PC1-x). The millions of available third-party content can be indexed, for example, in a third-party corpus database 116. Each third-party content index entry can reference the corresponding third-party content and/or include distribution parameters (DP1-DPx) (e.g. selection criteria) that condition the distribution of the corresponding third-party content.

In some implementations, the distribution parameters (e.g., selection criteria) for a particular third-party content can include distribution keywords that must be matched (e.g., by electronic documents or terms specified in the content request 112) in order for the third-party content to be eligible for presentation. The distribution parameters can also require that the content request 112 include information specifying a particular geographic region (e.g., country or state) and/or information specifying that the content request 112 originated at a particular type of client device (e.g., mobile device or tablet device) in order for the third-party content to be eligible for presentation. The distribution parameters can also specify a selection value (e.g., bid) and/or budget for distributing the particular third-party content.

The identification of the eligible third-party content can be segmented into multiple tasks 117a-117c that are then assigned among computing devices within the set of multiple computing devices 114. For example, different computing devices in the set of multiple computing devices 114 can each analyze a different portion of the third-party corpus database 116 to identify various third-party content having distribution parameters that match information included in the content request 112. In some implementations, each given computing device in the set of multiple computing devices 114 can analyze a different data dimension (or set of dimensions) and pass results 118a-118c of the analysis back to the third-party content distribution system 110. For example, the results 118a-118c provided by each of the computing devices in the set may identify a subset of third-party content that are eligible for distribution in response to the request and/or a subset of the third-party content that have certain distribution parameters or attributes.

In some implementations, a contextual database 124, e.g., maintained by the third-party content distribution system 110, can store contextual information that includes (and identifies relationships among) content requests 112 (e.g., search queries) and corresponding reply data 120 (e.g., search results). The contextual information can also include third-party requests 121 and resulting third-party data 122. In some implementations, the contextual database 124 can maintain historical contextual information, e.g., based on past user interactions, and/or contextual information for a current session, such as a current content request 112, current reply data 120, a current third-party request 121, and/or current third-party data 122.

The third-party content distribution system 110 aggregates the results 118a-118c received from the set of multiple computing devices 114 and uses information associated with the aggregated results to select one or more instances of third-party content that will be provided in response to the content request 112. For example, the third-party content distribution system 110 can select a set of winning third-party content based on the outcome of one or more content evaluation processes. In turn, the third-party content distribution system 110 can generate and transmit, over the network 102, reply data 120 (e.g., digital data representing a reply) that enable the client device 106 to integrate the set of winning third-party content into the given electronic document, such that the set of winning third-party content and the content of the electronic document are presented together at a display of the client device 106.

In some implementations, the client device 106 executes instructions included in the reply data 120, which configures and enables the client device 106 to obtain the set of winning third-party content from one or more third-party content servers. For example, the instructions in the reply data 120 can include a network location (e.g., a Uniform Resource Locator (URL)) and a script that causes the client device 106 to transmit a third-party request 121 to the third-party content server 108 to obtain a given winning third-party content from the third-party content server 108. In response to the request, the third-party content server 108 will transmit, to the client device 106, third-party data 122 that causes the given winning third-party content to be incorporated into the electronic document and presented at the client device 106.

In some implementations, a click-to-call request 126 that is presented at the client device 106 can be used to access content. For example, the reply data 120 or the third-party data 122 can be formatted at request time to include the click-to-call request 126, e.g., in response to the content request 112 or the third-party request 121, respectively. As a result, the click-to-call request 126 can include a script that dials a particular phone number in response to user interaction with the click-to-call control and also initiates a request for additional data that will be appended to the call. For example, the particular phone number can be a phone number that connects a user of the client device 106 to a callee identified in the reply data 120 or third-party data 122. Meanwhile, the additional data requested in response to the user interaction with the click-to-call control can include contextual information that is obtainable from the contextual database 124. The contextual information can be presented, for example, to the callee at the remote telecommunications device 128 so that the callee can obtain some context as to the nature of the call prior to answering the call. Further details regarding the use of the click-to-call request 126 and resulting operations are described below with reference to FIGS. 2 and 3.

Figure 2:
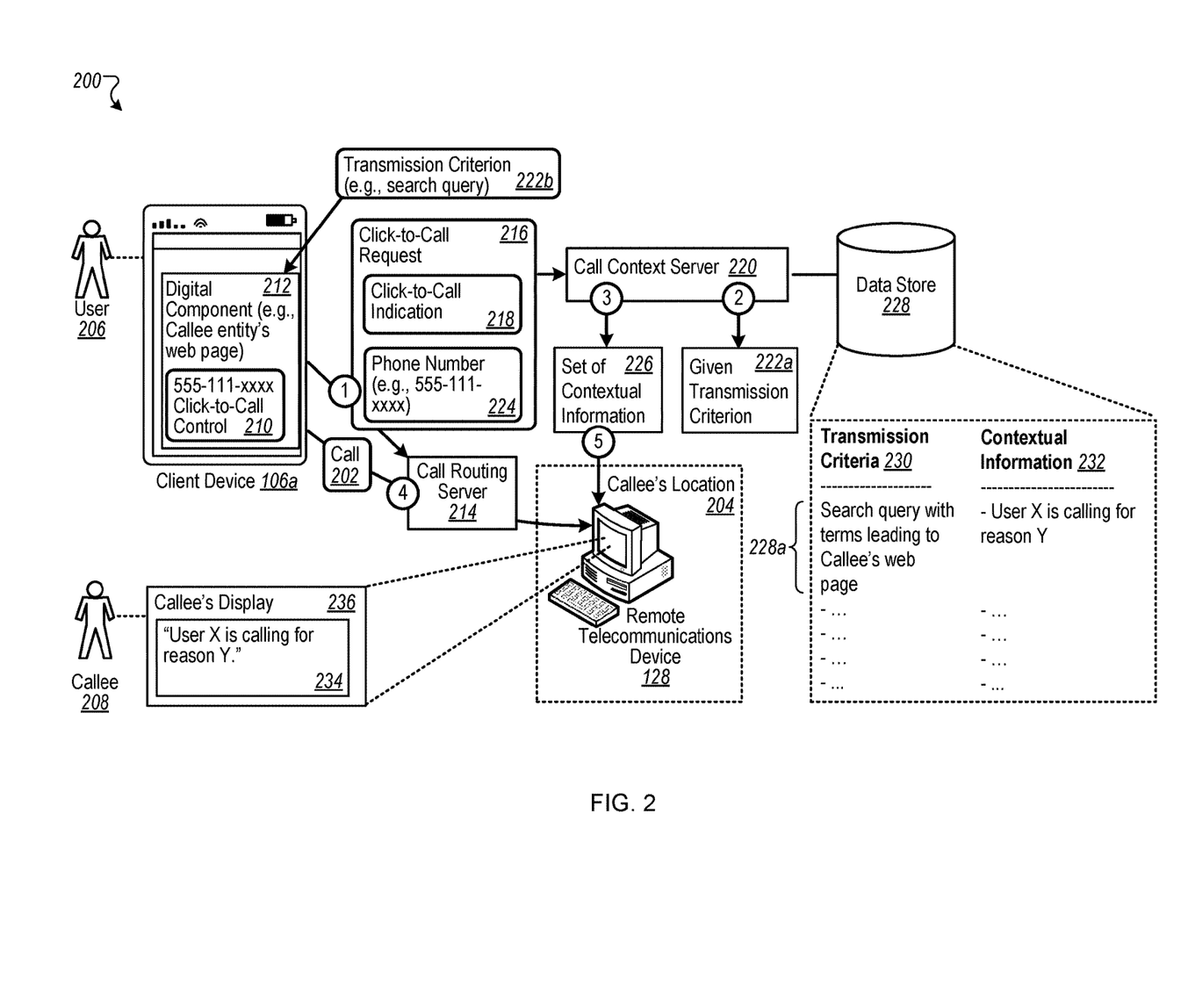
FIG. 2 shows an example system for providing contextual information associated with a call that is being connected.

FIG. 2 shows an example system 200 for providing contextual information associated with a call that is being connected. For example, a user 206 using a client device 106a can select a click-to-call control 210 presented with a digital component 212, e.g., a search results page, a webpage, a landing page, or some other resource. The click-to-call control 210 can be presented with a content item being presented to the user in the digital component 212, such as published by an entity that is called in response to the user interaction with the click-to-call control 210. In some implementations, stages 1-5 can be used for handling a click-to-call request 216 that is initiated upon user interaction with the click-to-call control 210.

In some implementations, a digital component is a discrete unit of content that is inserted into an electronic document that includes other information. For example, the digital component can be one or more files that present text, images, and/or other content within a web page or other resource, and can in some embodiments be formatted as an advertisement (or convey advertising information). In these implementations, the digital component can be provided from a different source (e.g., a digital component server) than the electronic document (e.g., web page or native application) in which the digital component is presented. As such, the digital component can be integrated into the electronic document when the electronic document is rendered at a client device.

At stage 1, as a result of the selection of the click-to-call control 210, the click-to-call request 216 can be received at a call routing server 214 for establishing a call 202 between the client device 106a and the remote telecommunications device 128. The click-to-call request 216 can indicate, for example, that the click-to-call control 210 was interacted with by the user 206 on the digital component 212 (e.g., a digital component maintained by an entity that is called in response to user interaction with the click-to-call control or a portion of content presented with the digital component).

At stage 2, using information in the click-to-call request 216, a call context server 220 can determine a given transmission criterion 222a that triggered distribution of the digital component 212 that was visually presented with the click-to-call control was interacted with at the client device 106a. For example, assume that the digital component 212 is presented in a search results page at the client device 106a. In this example, the given transmission criterion 222a may include the search query that was used to trigger presentation of the search results page and/or the digital component 212.

At stage 3, the call context server 220 can use the given transmission criterion 222a to identify a set of contextual information 226. For example, the call context server 220 can use a data store 228 that identifies relationships between transmission criteria 230 and contextual information 232 to identify (e.g., lookup) the contextual information. As a result, the set of contextual information 226 that is identified can provide information as to what the user 206 might be calling about in order to provide the information to the callee 208 so that, for example, the callee 208 can better assist the caller.

At stage 4, the call routing server 214 can connect the call 202 between the client device 106a (e.g., a mobile device of the user 206) with the remote telecommunications device 128 (e.g., a computer at the callee's location 204). The connection can be made, for example, using a phone number 224 identified in the click-to-call request 216.

At stage 5, the call context server 220 can transmit the set of contextual information (e.g., "user X is calling for reason Y") to the remote telecommunications device 128. The contextual information can be communicated to the callee in a variety of ways prior to the callee being placed in communication with the caller. For example, the contextual information can be provided in a form of a "whisper" that accompanies the incoming call, such as in a message audibly presented to the callee 208 prior to communication between the caller and callee 208. In some implementations, the contextual information is presented in visual form, such as in a caller identification field 234 in a display 236 that is displayed on the remote telecommunications device 128. Alternatively, or additionally, the contextual information can be transmitted to a computing device (or mobile device) of the callee. For example, the contextual information could be sent as a text message, multimedia message, e-mail, instant message, or in another form, and presented by a device other than the remote telecommunications device 128 that receives the phone call. As such, the contextual information can be provided even when the callee's phone does not support presentation of the contextual information.

Figure 3:
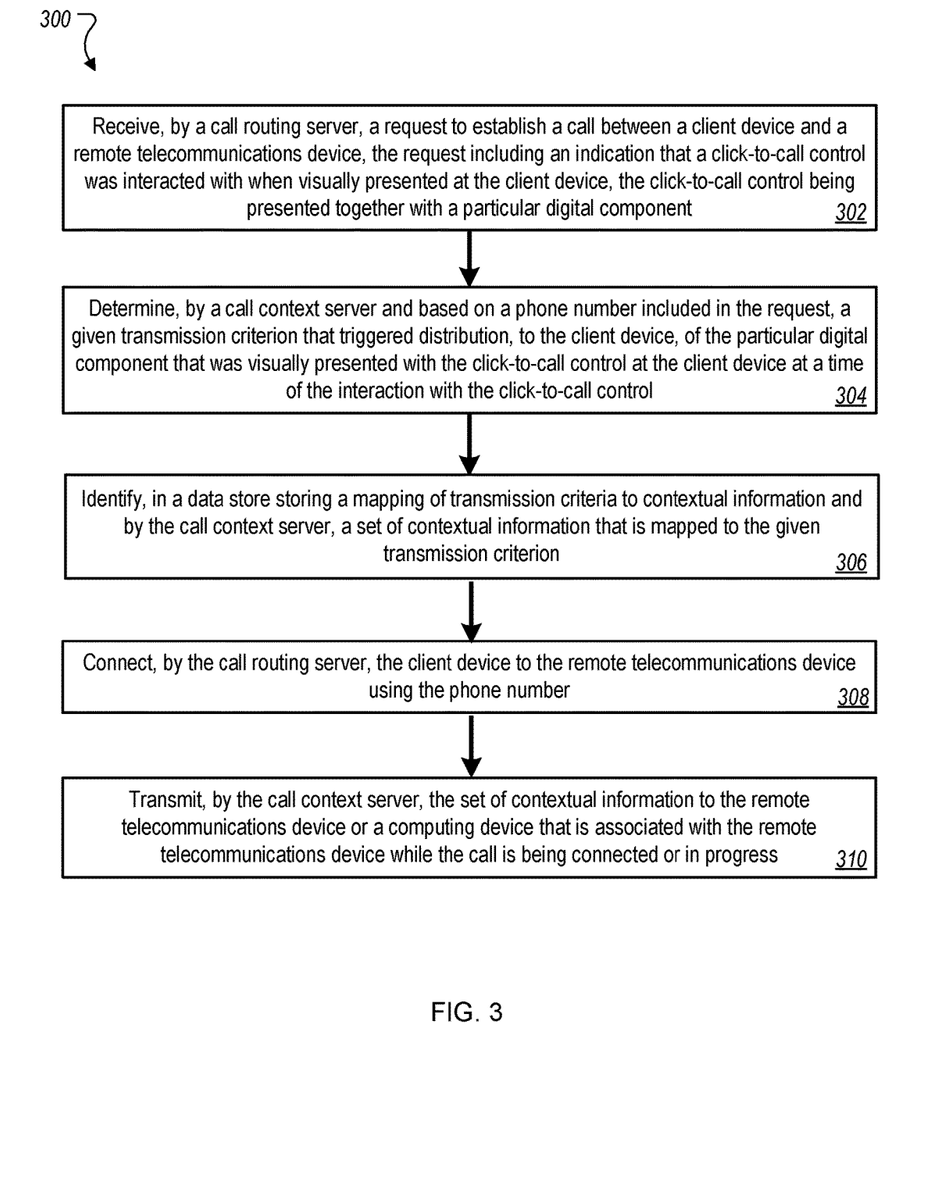
FIG. 3 is a flowchart of an example process for providing contextual information associated with a call that is being connected.

FIG. 3 is a flowchart of an example process 300 for providing contextual information associated with a call that is being connected. In some implementations, the third-party content distribution system 110 and components that it includes can perform steps of the process 300 using one or more servers and a memory device storing instructions that are executed by one or more processors. For example, the call routing server 214 can route calls resulting from the selection of click-to-call controls, and the call context server 220 can provide contextual information for the calls. FIGS. 1 and 2 are used to provide example structures for performing the steps of the process 300. For example, stages 1-5 described with reference to FIG. 2 track to steps 302-310, respectively.

The process 300 can begin, for example, when a request is received by a call routing server to establish a call between a client device and a remote telecommunications device (302). The request includes an indication that a click-to-call control was interacted with when visually presented at the client device, the click-to-call control being presented together with a particular digital component. For example, the call routing server 214 can receive (e.g., at stage 1 in FIG. 2) the click-to-call request 216 to establish the call 202 between the client device 106a and the remote telecommunications device 128. The click-to-call request 216 can indicate (e.g., using an indication 218) that the click-to-call control 210 was selected by the user 206 on the digital component 212 (e.g., an advertisement or a webpage provided by an entity that is called in response to user interaction with the click-to-call control).

In some implementations, the click-to-call request 216 can include information about a user initiating the request, such as information obtained from a cookie associated with the user 206 and stored on the client device 106a. In some implementations, cookie information in the cookie can include information about the user 206 and information about past interactions of the user 206. For example, the cookie information can include information identifying previous online search activity, browsing history, transaction history, or other online activity.

A given transmission criterion that triggered distribution of the particular digital component to the client device is determined (304). The given transmission criterion can be the transmission criterion that caused the particular digital component to be visually presented with the click-to-call control at the time of the user interaction with the click-to-call control. The given transmission criterion that triggered distribution of the particular digital component can be determined based on a phone number that is included in the request. For example, using information in the click-to-call request 216, the call context server 220 can determine (e.g., at stage 2 in FIG. 2) that the given transmission criterion 222a is a search query entered by the user 206 on the client device 106a. Identifying the search query as the given transmission criterion 222a can include, for example, identifying search query terms that are included in the search query that resulted in the presentation of the digital component 212 (e.g., the callee's entity's digital component). The search query terms can include, for example, search query terms that identify an entity of the callee 208. For example, the search query terms can identify the entity by name, or the search query terms can identify a product or service that is offered by the entity. The phone number 224 included in the click-to-call request 216 can be a phone number, for example, that is known to be tied to the callee 208. The phone number 224 can also be used, together with the search query terms, to identify the transmission criterion. The call context server 220 can make the determination, for example, by looking up transmission criteria associated with the phone number 224 (e.g., 555-111-xxxx) that is included in the click-to-call request 216 and that matches the phone number presented with the click-to-call control 210. The call context server 220 can further identify the phone number 224, for example, as a phone number belonging to the callee's location 204, and use that information along with other information in the click-to-call request 216 to identify the given transmission criterion 222a. Other ways for identifying the given transmission criterion can be used, such as by using information from the contextual database 124 that indicates past user interactions with content or interactions by the user in a current session. For example, the contextual information can include terms from search queries submitted by the user or terms from search results pages (of subsequent pages) that resulted from the search queries.

In some implementations, interactions by the user in a current session or at a previous time can be identified from information in a cookie, such as identifying the name of the entity tied to the particular digital component and optionally including information identifying past user interactions with the particular digital component. Information in the cookie, such as an identifier or other information of the user 206, can be included in the click-to-call request 216 and used to map the click-to-call request 216 to the user 206.

In some implementations, determining the given transmission criterion that triggered distribution, to the client device, of the particular digital component includes determining the particular digital component based on the phone number included in the request and determining, based on the time of the interaction or an identifier of the particular digital component, the given transmission criterion. For example, by comparing times of the presentation of the digital component and selection of the click-to-call control 210, the call context server 220 can determine that the given transmission criterion resulted in the presentation of the digital component 212. A comparison can be made, for example, between a time that a search query was entered and a time that the click-to-call request 216 was made from a digital component provided to the user 206 in response to, or as a result of, the search query. If a difference in the times is below a threshold (e.g., five minutes), then the search query can be determined to be the given transmission criterion 222a. In another example, the call context server 220 can determine the given transmission criterion 222a based on an identifier of the digital component 212. For example, if the digital component 212 is a webpage owned or published by the callee 208, then identifying the given transmission criterion 222a can include parsing a URL or other indicator of the digital component or parsing the digital component itself. The parsing can extract terms that identify, for example, the name of the callee 208 or an entity owned or operated by the callee 208, the entity providing products and/or services of the callee 208. In some implementations, the time of the interaction can correspond to a time-of-day that indicates a likelihood that the caller has a particular interest or is likely to take a particular action. For example, historical information may show that late afternoon selection by users of click-to-call controls have a high correlation with products and services received the next day.

A set of contextual information that is mapped to the given transmission criterion is identified, by the call context server, in a data store storing a mapping of transmission criteria to contextual information (306). For example, the call context server 220 can use the given transmission criterion 222a to identify (e.g., at stage 2 in FIG. 2) the set of contextual information 226. The call context server 220 can use the data store 228 that identifies, for example, relationships between transmission criteria 230 and contextual information 232. For example, the data store 228 can include an entry 228a that, when the transmission criteria 230 includes certain search query terms, the contextual information 232 specifies that user X is calling for reason Y.

In some implementations, historical data identifying past or recent interactions of the user 206 can be used to determine content. For example, prior to selecting the click-to-call control 210, if the user 206 has searched for subject Z (or viewed digital components containing information about subject Z), the click-to-call request 216 can include information identifying subject Z. A mapping can be created, for example, between contextual data and a search history of the user 206. In some implementations, more recent search activity of the user 206 can indicate a greater confidence, for example, of the mapping than say a search activity that is several days old.

The client device is connected, by the call routing server, to the remote telecommunications device using the phone number (308). For example, the call routing server 214 (e.g., at stage 4 in FIG. 2) can connect the client device 106a (e.g., a mobile device of the user 206) with the remote telecommunications device 128 (e.g., a telephone or computer at the callee's location 204). The connection can be made, for example, using the phone number 224 identified in the click-to-call request 216.

The set of contextual information is transmitted, by the call context server, to the remote telecommunications device or a computing device that is associated with the remote telecommunications device while the call is being connected or in progress (310). For example, the call context server 220 can transmit (e.g., at stage 5 in FIG. 2) the set of contextual information (e.g., "user X is calling for reason Y") to the remote telecommunications device 128. In some implementations, the contextual information can be in a form of a whisper that accompanies the incoming call, such as in a message that can be heard by the callee 208 that is listened to before communicating with the caller. In some implementations, the contextual information is presented in visual form, such as in a caller identification field 234 in a display 236 that is displayed on the remote telecommunications device 128.

In some implementations, the indication that a click-to-call control was interacted with at a client device is received in the form of Voice over Internet Protocol (VoIP) call information that specifies the phone number corresponding to the particular digital component that was presented with the click-to-call control. In these situations, the set of contextual information that is transmitted to the remote telecommunications device can be embedded in VoIP call setup data that is transmitted to the remote phone device. For example, the call context server 220 can format text included in the set of contextual information 226 into digital data that can be inserted into a field of the VoIP call setup data. In this way, the context of the call 202 can be reproduced at the remote telecommunications device 128, for example, as text presented in a display of the called telecommunications device. In some implementations, VoIP call setup techniques can be used to create packets that include other multimedia features, including video capabilities, such as to graphically provide a caller's reason for the call in the caller identification field 234 or to connect the call 202 as an audio-visual presentation. For example, techniques for handling VoIP calls can include signaling, channel set-up, digitization of analog voice signals (or translation from text), encoding, and then transmission of IP packets over a packet-switched network. In this way, the call 202 and the contextual information 226 can be delivered to the callee 208 who may be using a combination of headsets, computer screens, and/or other equipment.

In some implementations, the set of contextual information is transmitted to the remote telecommunications device in the form of an audible message that audibly conveys the set of contextual information when the remote telecommunications device is activated to receive the call, but prior to enabling audio communications between a user of the client device and a user of the remote telecommunications device. For example, the set of contextual information 226 can be provided as a whisper that can be listened to by the callee 208 before starting a conversation with the user 206.

In some implementations, the request to establish the call specifies a search query that triggered presentation of the particular digital component that was visually presented with the click-to-call control at the client device at a time of the interaction with the click-to-call control. In these situations, packetized data that specifies a particular post call activity that is mapped to the given transmission criterion in the data store can be generated and transmitted to the remote telecommunications device. For example, based on information in the received click-to-call request 216, the call context server 220 can determine that a search query (e.g., "nearby Z entities") entered by the user 206 on the client device 106a is the transmission criterion 222b that resulted in presentation of the digital component 212 (e.g., a search result or advertisement related to Z entities). As a result, the set of contextual information 226 provided by the call routing server 214 to the remote telecommunications device 128 can indicate that user X is calling for reason Y, as determined by a mapping by the entry 228a in the data store 228.

In some implementations, the call context server 220 can use keywords from the search query to determine an intent of the query and thus determine the set of contextual information 226. The keywords can be related, for example, to a known set of services made available by an entity (e.g., the callee's location 204). In some implementations, the call context server 220 can determine the set of contextual information 226 from keywords that appear on a digital component (e.g., that contains the click-to-call control 210) arrived at by the user from the search results of the query.

In some implementations, the packetized data can cause the remote telecommunications device to visually present the particular post call activity on a display. For example, the set of contextual information 226 can include information about the call 202 in the display 236 on the remote telecommunications device 128. The post call activity can include, for example, information received from the client device 106a that can be used to display initial information in a visual representation of a conversation between the user 206 and the callee 208.

In some implementations, the set of contextual information is transmitted as caller identification information that is presented in a caller identification field of a display of the remote telecommunications device. For example, the caller identification field 234 in the display 236 presented on the remote telecommunications device 128 can identify reason Y as the post call activity associated with the call 202 being received by the callee 208.

In some implementations, transmitting the set of contextual information to the remote telecommunications device can include transmitting text to speech data specifying the set of contextual information to the remote telecommunications device. For example, information provided by the call context server 220 for use in the caller identification field 234 can include information generated from the contextual information 232. The digital data can be consumed by the remote telecommunications device 128, such as to produce a whisper that precedes an audible connection between the user 206 and the callee 208.

In some implementations, the set of contextual information 226 can include information, such as user-specific information, that can be used at the remote telecommunications device 128 to automatically perform functions. For example, applications executing at the remote telecommunications device 128 can automatically fill in user-related information, such as in forms, or automatically navigate to screens associated with certain types of users or services, to name a few examples. In some implementations, the set of contextual information 226 can include information by which scheduling can occur, e.g., to display available time slots for providing a service related to the contextual information associated with the user making the call 202. In some implementations, the set of contextual information 226 (or the call-from number) can be used to automatically look up user information, such as from a user file, at the time that the call 202 is being connected, thereby streamlining interaction with the caller during the call.

In some implementations, the set of contextual information 226 can be determined and passed in various ways. For example, in a mobile context, the tapping of a phone number link can be tracked, and details about the caller can be passed to a business (e.g., the callee's location 204). In some implementations, an intermediary server, such as the call routing server 214, can serve as an intermediary server that call-forwards a unique phone number that is presented to the user 206 with the click-to-call control 210. In this example, the call routing server 214 can provide query information used by the user 206, e.g., including query terms resulted in search results leading to presentation of the click-to-call control 210.

Figure 4:
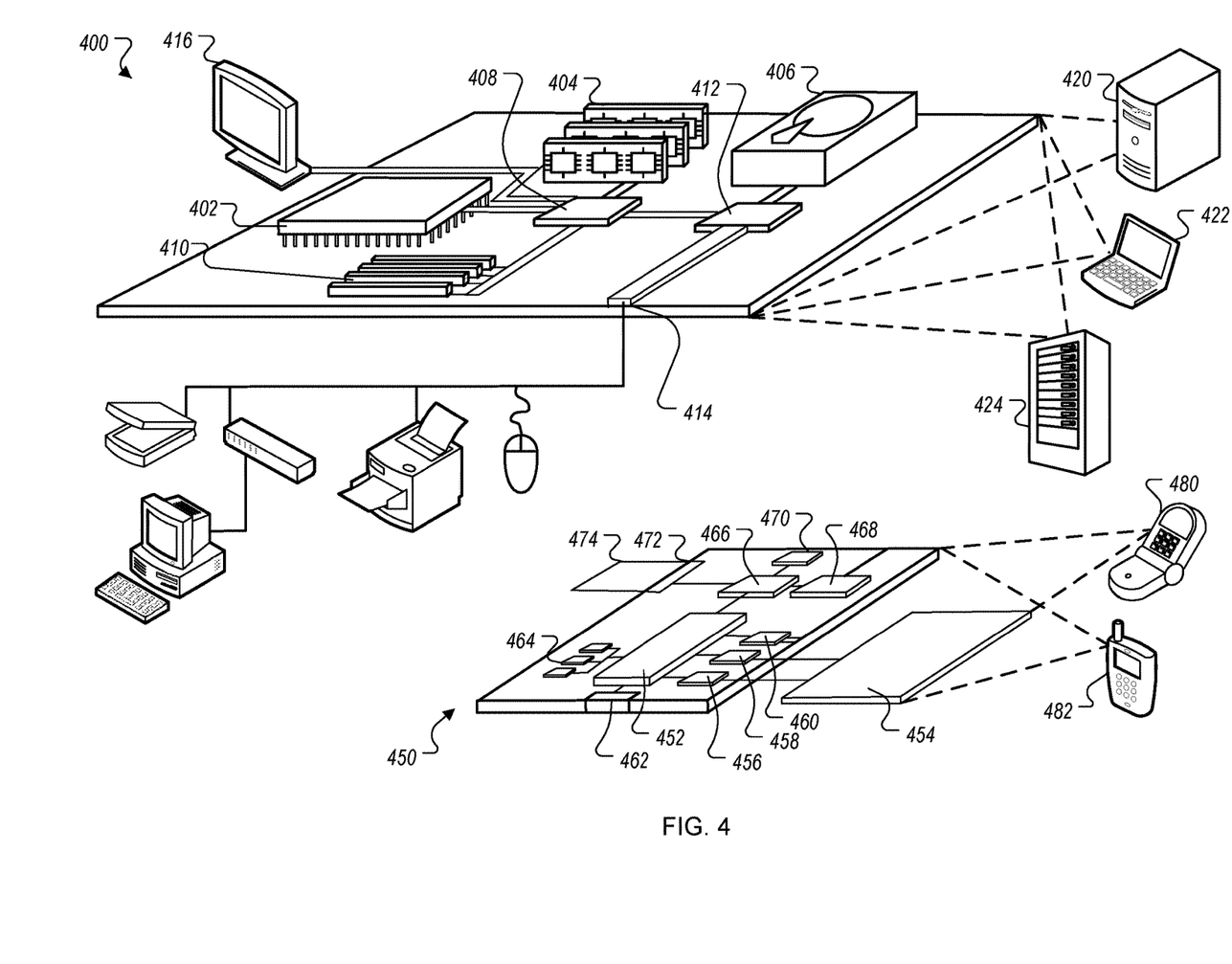
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provided as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method, comprising:
   receiving, by a call routing server, a request to establish a call between a client device and a remote telecommunications device, the request including an indication that a click-to-call control was interacted with when visually presented at the client device, the click-to-call control being presented together with a particular digital component;
   determining, by a call context server and based on a phone number included in the request to establish the call, a given transmission criterion that triggered distribution, to the client device, of the particular digital component that was visually presented with the click-to-call control at the client device at a time of the interaction with the click-to-call control, wherein the given transmission criterion includes a keyword that triggers transmission of the particular digital component when the keyword is matched;

identifying, in a data store storing a mapping of transmission criteria to contextual information and by the call context server, a set of contextual information that is mapped to the keyword that triggered transmission of the particular digital component given transmission criterion;

connecting, by the call routing server, the client device to the remote telecommunications device using the phone number; and transmitting, by the call context server, the identified set of contextual information to the remote telecommunications device or a computing device that is associated with the remote telecommunications device while the call is being connected or in progress.

2. The method of claim 1, wherein:

receiving an indication that a click-to-call control was interacted with at a client device comprises receiving VoIP call information that specifies the phone number corresponding to the particular digital component that was presented with the click-to-call control; and transmitting the identified set of contextual information to the remote telecommunications device comprises embedding the identified set of contextual information in VoIP call setup data that is transmitted to the remote telecommunications device.

3. The method of claim 1, wherein transmitting the identified set of contextual information to the remote telecommunications device comprises transmitting an audible message that audibly conveys the identified set of contextual information when the remote telecommunications device is activated to receive the call, but prior to enabling audio communications between a user of the client device and a user of the remote telecommunications device.

4. The method of claim 1, wherein:

receiving a request to establish a call comprises receiving a request that specifies a search query that triggered presentation of the particular digital component that was visually presented with the click-to-call control at the client device at a time of the interaction with the click-to-call control; and transmitting the identified set of contextual information to the remote telecommunications device comprises generating packetized data that specifies a particular post call activity that is mapped to the given transmission criterion in the data store.

5. The method of claim 4, wherein the packetized data causes the remote telecommunications device to visually present the particular post call activity on a display.

6. The method of claim 1, wherein transmitting the identified set of contextual information to the remote telecommunications device comprises transmitting the identified set of contextual information as caller identification information that is presented in a caller identification field of a display of the remote telecommunications device.

7. The method of claim 1, wherein transmitting the identified set of contextual information to the remote telecommunications device comprises transmitting text to speech data specifying the identified set of contextual information to the remote telecommunications device.

8. The method of claim 1, wherein determining, by a call context server and based on the phone number included in the request, a given transmission criterion that triggered distribution, to the client device, of the particular digital component that was visually presented with the click-to-call control at the client device at a time of the interaction with the click-to-call control comprises:

determining the particular digital component based on the phone number included in the request, and determining, based on the time of the interaction or an identifier of the particular digital component, the given transmission criterion.

9. A non-transitory computer program product embodied in a non-transitive computer-readable medium including instructions, that when executed, cause one or more processors to perform operations including:

receiving, by a call routing server, a request to establish a call between a client device and a remote telecommunications device, the request including an indication that a click-to-call control was interacted with when visually presented at the client device, the click-to-call control being presented together with a particular digital component;

determining, by a call context server and based on a phone number included in the request to establish the call, a given transmission criterion that triggered distribution, to the client device, of the particular digital component that was visually presented with the click-to-call control at the client device at a time of the interaction with the click-to-call control, wherein the given transmission criterion includes a keyword that triggers transmission of the particular digital component when the keyword is matched;

identifying, in a data store storing a mapping of transmission criteria to contextual information and by the call context server, a set of contextual information that is mapped to the keyword that triggered transmission of the particular digital component given transmission criterion;

connecting, by the call routing server, the client device to the remote telecommunications device using the phone number; and transmitting, by the call context server, the identified set of contextual information to the remote telecommunications device or a computing device that is associated with the remote telecommunications device while the call is being connected or in progress.

10. The non-transitory computer program product of claim 9, wherein:

receiving an indication that a click-to-call control was interacted with at a client device comprises receiving VoIP call information that specifies the phone number corresponding to the particular digital component that was presented with the click-to-call control; and transmitting the identified set of contextual information to the remote telecommunications device comprises embedding the identified set of contextual information in VoIP call setup data that is transmitted to the remote telecommunications device.

11. The non-transitory computer program product of claim 9, wherein transmitting the identified set of contextual information to the remote telecommunications device comprises transmitting an audible message that audibly conveys the identified set of contextual information when the remote telecommunications device is activated to receive the call, but prior to enabling audio communications between a user of the client device and a user of the remote telecommunications device.

12. The non-transitory computer program product of claim 9, wherein:

receiving a request to establish a call comprises receiving a request that specifies a search query that triggered presentation of the particular digital component that was visually presented with the click-to-call control at the client device at a time of the interaction with the click-to-call control; and transmitting the identified set of contextual information to the remote telecommunications device comprises generating packetized data that specifies a particular post call activity that is mapped to the given transmission criterion in the data store.

13. The non-transitory computer program product of claim 12, wherein the packetized data causes the remote telecommunications device to visually present the particular post call activity on a display.

14. The non-transitory computer program product of claim 9, wherein transmitting the identified set of contextual information to the remote telecommunications device comprises transmitting the identified set of contextual information as caller identification information that is presented in a caller identification field of a display of the remote telecommunications device.

15. The non-transitory computer program product of claim 9, wherein transmitting the identified set of contextual information to the remote telecommunications device comprises transmitting text to speech data specifying the identified set of contextual information to the remote telecommunications device.

16. The non-transitory computer program product of claim 9, wherein determining, by a call context server and based on the phone number included in the request, a given transmission criterion that triggered distribution, to the client device, of the particular digital component that was visually presented with the click-to-call control at the client device at a time of the interaction with the click-to-call control comprises:
  determining the particular digital component based on the phone number included in the request, and determining, based on the time of the interaction or an identifier of the particular digital component, the given transmission criterion.

17. A system comprising:
  one or more processors; and
  one or more memory elements including instructions that, when executed, cause the one or more processors to perform operations including:
    receiving, by a call routing server, a request to establish a call between a client device and a remote telecommunications device, the request including an indication that a click-to-call control was interacted with when visually presented at the client device, the click-to-call control being presented together with a particular digital component;
    determining, by a call context server and based on a phone number included in the request to establish the call, a given transmission criterion that triggered distribution, to the client device, of the particular digital component that was visually presented with the click-to-call control at the client device at a time of the interaction with the click-to-call control, wherein the given transmission criterion includes a keyword that triggers transmission of the particular digital component when the keyword is matched;
    identifying, in a data store storing a mapping of transmission criteria to contextual information and by the call context server, a set of contextual information that is mapped to the keyword that triggered transmission of the particular digital component given transmission criterion;
    connecting, by the call routing server, the client device to the remote telecommunications device using the phone number; and
    transmitting, by the call context server, the identified set of contextual information to the remote telecommunications device or a computing device that is associated with the remote telecommunications device while the call is being connected or in progress.

18. The system of claim 17, wherein:
  receiving an indication that a click-to-call control was interacted with at a client device comprises receiving VoIP call information that specifies the phone number corresponding to the particular digital component that was presented with the click-to-call control; and
  transmitting the identified set of contextual information to the remote telecommunications device comprises embedding the identified set of contextual information in VoIP call setup data that is transmitted to the remote telecommunications device.

19. The system of claim 17, wherein transmitting the identified set of contextual information to the remote telecommunications device comprises transmitting an audible message that audibly conveys the identified set of contextual information when the remote telecommunications device is activated to receive the call, but prior to enabling audio communications between a user of the client device and a user of the remote telecommunications device.

20. The system of claim 17, wherein:
  receiving a request to establish a call comprises receiving a request that specifies a search query that triggered presentation of the particular digital component that was visually presented with the click-to-call control at the client device at a time of the interaction with the click-to-call control; and
  transmitting the identified set of contextual information to the remote telecommunications device comprises generating packetized data that specifies a particular post call activity that is mapped to the given transmission criterion in the data store.

* * * * *